(12) United States Patent
Cho et al.

(10) Patent No.: US 12,629,621 B2
(45) Date of Patent: May 19, 2026

(54) ANTIMICROBIAL FILTER MEDIA

(71) Applicant: Purafil, Inc., Doraville, GA (US)

(72) Inventors: Donald Cho, Carrollton, TX (US);
William G. England, Suwanee, GA
(US); Anthony John Lawson, Verona
(IT); Gerrit Wijbenja, Leeuwarden
(NL); Mei Xin, Suwanee, GA (US)

(73) Assignee: Purafil, Inc., Doraville, GA (US)

( * ) Notice: Subject to any disclaimer, the term of this
patent is extended or adjusted under 35
U.S.C. 154(b) by 754 days.

(21) Appl. No.: 17/742,675

(22) Filed: May 12, 2022

(65) Prior Publication Data

US 2022/0362696 A1     Nov. 17, 2022

Related U.S. Application Data

(60) Provisional application No. 63/188,177, filed on May
13, 2021.

(51) Int. Cl.
B01D 53/22 (2006.01)
B01D 39/16 (2006.01)
B01D 39/20 (2006.01)

(52) U.S. Cl.
CPC ....... B01D 39/163 (2013.01); B01D 39/2048
(2013.01); *B01D 2239/0233* (2013.01); *B01D*
*2239/0442* (2013.01); *B01D 2239/0618*
(2013.01); *B01D 2239/10* (2013.01);
(Continued)

(58) Field of Classification Search
CPC .............. B01D 39/163; B01D 39/2048; B01D 2239/0233; B01D 2239/0442; B01D
2239/0618; B01D 2239/10; B01D
2239/1225; B01D 2239/1258; B01D
2239/1291
See application file for complete search history.

(56)     References Cited

U.S. PATENT DOCUMENTS

2006/0117958 A1*   6/2006   Sakadume ......... B01D 39/1615
                                                              96/223
2007/0056256 A1*   3/2007   Tepper ................. B01D 71/027
                                                              55/527
2008/0023385 A1    1/2008   Baker, Jr et al.
                            (Continued)

FOREIGN PATENT DOCUMENTS

KR     10-2020-0042594 A     4/2020

OTHER PUBLICATIONS

"AGION_7-5-18" <https://www.cottonworks.com/wp-content/uploads/
2018/07/AGION_7-5-18.pdf> 1 page, Jul. 5, 2018 (Year: 2018).*
(Continued)

*Primary Examiner* — Anthony Shumate
(74) *Attorney, Agent, or Firm* — Vedder Price P.C.

(57)     ABSTRACT

A product and method of manufacturing and producing
antimicrobial fibers using an antimicrobial additive material.
The method comprising using various antimicrobial metals
incorporated and embedded into an inorganic material as
metal ions within the additive material that can be formu-
lated into a masterbatch precursor material and processed to
manufacture fine or synthetic fibers using standard manu-
facturing processes for use in applications from face masks
and respirators to air filters for HVAC and higher efficiency
HEPA applications.

12 Claims, 6 Drawing Sheets

Manufacture Of Monofilament Fiber And Low Melt Binder Fiber

Manufacture Of Active Monofilament Fibers

(52) U.S. Cl.
CPC ................ *B01D 2239/1225* (2013.01); *B01D 2239/1258* (2013.01); *B01D 2239/1291* (2013.01)

(56) References Cited

U.S. PATENT DOCUMENTS

| | | | | |
|---|---|---|---|---|
| 2011/0016838 A1* | 1/2011 | Smithies | ................... | B32B 3/28 |
| | | | | 156/181 |
| 2011/0192789 A1* | 8/2011 | Gogotsi | ................. | D04H 1/728 |
| | | | | 427/470 |
| 2013/0025456 A1* | 1/2013 | Chapman | ........... | B01D 46/0028 |
| | | | | 95/285 |
| 2014/0157742 A1* | 6/2014 | Healey | ................. | B01D 46/522 |
| | | | | 55/514 |
| 2016/0166960 A1 | 6/2016 | Choi et al. | | |
| 2018/0280847 A1* | 10/2018 | Barlow, Jr. | .......... | D04H 1/4258 |
| 2018/0290088 A1* | 10/2018 | Kadavy | ................. | B01D 69/12 |
| 2018/0326335 A1* | 11/2018 | Haberkamp | ......... | B01D 39/163 |
| 2020/0061504 A1 | 2/2020 | Viskari et al. | | |
| 2020/0188835 A1 | 6/2020 | England | | |
| 2020/0254372 A1* | 8/2020 | Dutkiewicz | ............ | B01D 39/18 |
| 2025/0243605 A1* | 7/2025 | Kinadjian Caplat | .... | D01D 5/36 |

OTHER PUBLICATIONS

"Agion_Active_XL_Product_Sheet" <https://www.sciessent.com/wp-content/uploads/2019/08/Agion_Active_XL_Product_Sheet.pdf> 2 pages, Aug. 2019 (Year: 2019).*

International Search Report and Written Opinion filed in PCT/US2022/029121; dated Aug. 31, 2022; 12 pgs.

Product Sheet, Microbes Have Met Their Match, Textiles & Apparel, Sciessent.com; obtained from https://www.sciessent.com/wp-content/uploads/2021/10/Sciessent-Agion-SellSheet.pdf?utm_source=chatgpt.com; 3 pgs.

* cited by examiner

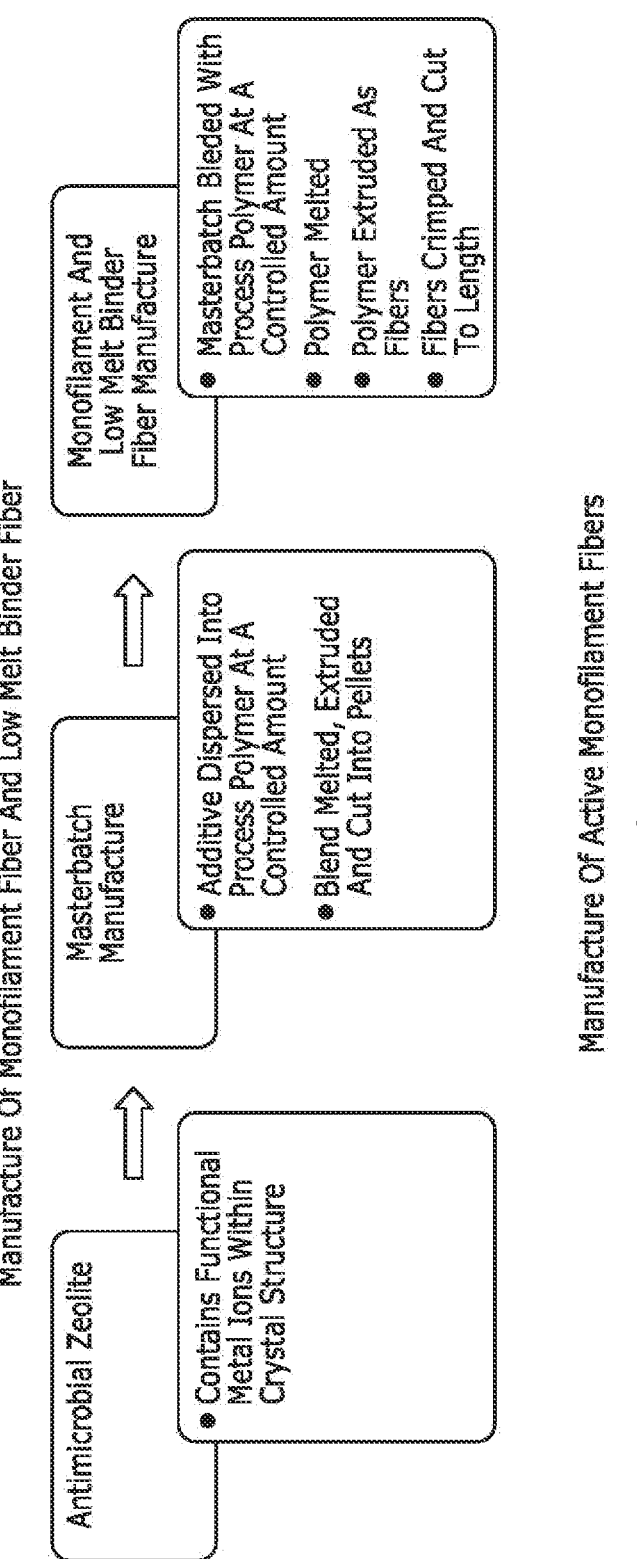

Manufacture Of Monofilament Fiber And Low Melt Binder Fiber

Antimicrobial Zeolite
- Contains Functional Metal Ions Within Crystal Structure

Masterbatch Manufacture
- Additive Dispersed Into Process Polymer At A Controlled Amount
- Blend Melted, Extruded And Cut Into Pellets

Monofilament And Low Melt Binder Fiber Manufacture
- Masterbatch Bleded With Process Polymer At A Controlled Amount
- Polymer Melted
- Polymer Extruded As Fibers
- Fibers Crimped And Cut To Length Manufacture Of Active Monofilament Fibers

Figure 1

Manufacture Of Active Bicomponent Binder Fibers

Manufacture Of Filter Media

Figure 8

ANTIMICROBIAL FILTER MEDIA

CROSS-REFERENCE TO OTHER APPLICATION

This Application claims the benefit of and priority to U.S. Provisional Application No. 63/188,177 filed May 13, 2021, the content of which is hereby incorporated by reference.

FIELD OF THE DISCLOSURE

The present disclosure generally relates to a method of manufacturing improved filter media comprising antimicrobial fibers embedded with a novel antimicrobial zeolite additive material. More particularly, the present disclosure is directed to a product and method of manufacturing antimicrobial fibers embedded with an inherently fixed, antimicrobially active additive element that can be further processed using a range of standard manufacturing processes to form filter media for use in applications from face masks and respirators to air filters for Heating Ventilation Air Conditioning (HVAC) and High Efficiency Particulate Air (HEPA) applications.

BACKGROUND OF THE DISCLOSURE

The quality of air cleanliness is becoming increasingly important globally. Fine particulate aerosols in the atmosphere known as PM2.5 and PM10, are primarily related to airborne chemical pollutants known by their particle sizes measured in microns. These particulates can enter the lungs and induce adverse health effects leading to a significant increase in the use of high efficiency filters and improved air handling in a wide range of environments such as in cars, houses and offices. However, increasingly these filter systems are actively being used to capture finer, submicron particulate-sized contaminants of biological origin such as pollen, bacteria and viruses.

Air filters used for HVAC and higher efficiency HEPA applications need higher levels of efficiency and performance as the challenge of capturing finer particle size biological specimens continuously gets harder. Conventional air circulating and air conditioning systems currently used in office buildings can further deteriorate the quality of the air within the building. For example, in order to reduce energy costs in heating or cooling air, modern systems generally recycle air through filters while adding new "make-up" fresh air from external sources—sometimes making it around 20% of the total air circulation within a building. Such recycling of air can spread contamination from one area to another within a building.

It is well known within the industry that currently available air filters designed for such applications have inherent limitations when it comes to physically capturing contaminated pathogens and removing them to improve air quality. Once contaminated, a filter element is effectively a biohazard risk if the captured contaminants remain biologically active, making the exchange of filters at the end of life a handling issue and a potential hazard.

It is to be further noted that another limitation is biological fouling with buildup of biological films on the surface of the filters in warmth and humidity, leading to premature blockage of the filter, associated pressure drop increase and a risk of biological growth leading to secondary emission of particulates into the atmosphere. In addition, in service, once an air filter becomes contaminated, there is the risk of re-entrainment of the material within the air flow exiting the filter, reducing the effectiveness of the filter itself in reducing harmful pathogens entering the air.

Reverse contamination of the air or even the risk of handling the contaminated surfaces when the filter is exchanged can cause health issues for the general public. In addition, in places where ensuring air quality hygiene is of the utmost importance, such as hospitals, pathogens in the filter media could make the filter a potential biohazard. Further, tropical and warm conditions can create a conducive environment for trapped spores or bacteria to multiply and grow and thereby create a hazardous downstream risk that the air filtration systems are designed to avoid.

Therefore, there is clearly a market need for a simple and efficient means of contamination removal from air filtration systems. More particularly, there is an inherent need to ensure that the surface of the filter is hygienic through the safe elimination of the pathogens captured into the fiber matrix of the filter to eliminate the risk of subsequent re-entrainment of the material within the air flow exiting the filter.

Currently available technical approaches to address the foregoing and mitigate contamination of the air filtration system have various shortcomings. Prior art solutions generally include inefficient processes such as irradiating the surface with UV radiation or material coatings with functional additives such as metal ions. However, the currently available solutions have either limited lifetime or limited efficacy and can add significantly to the manufactured cost of the filter element through additional process steps and functional components such as UV light sources or high-cost materials.

The present disclosure is directed to overcome the prior art limitations by manufacturing antimicrobial fibers embedded with a novel antimicrobial zeolite additive material wherein the additive comprises a permanently high level of antimicrobial activity by incorporating antimicrobial, functional metal ions including (but not limited to) zinc, copper and silver within the zeolite crystalline structure that can be released into the environment in the presence of moisture associated with biological particles over the lifetime of the elements.

SUMMARY OF THE DISCLOSURE

Embodiments disclosed in the present disclosure provide a method of manufacturing antimicrobial fibers embedded with an inherently fixed antimicrobially active additive element that can be further processed using a range of standard manufacturing processes to form filter media for use in various applications.

The present disclosure generally relates to a method of manufacturing an improved filter media using antimicrobial fibers embedded with a novel antimicrobial zeolite additive material. In the depicted embodiment, the antimicrobial fibers produced can then be further processed using a range of standard manufacturing processes to form filter media with different levels of efficiency for use in applications from face masks and respirators to air filters for air-conditioning (HVAC) and higher efficiency HEPA applications. Byway of example and not of limitation, use of standard processes to create improved filter media products creates cost-effective solutions within the air filtration industry.

In an aspect of the present disclosure, additives comprising a permanently high level of antimicrobial activity by incorporating antimicrobial, functional metal ions Including (but not limited to) zinc, copper and silver are processed Into masterbatch materials by dispersion into low melting polymer materials such as (and not restricted to) polypropylene, poly(ethylene terephthalate), polyethylene, poly(butylene terephthalate). These masterbatch materials are pelletised and added to the polymer melt of a suitable polymer such as (and not restricted to) polypropylene, poly(ethylene terephthalate), polyethylene, poly(butylene terephthalate).

In an aspect of the present disclosure, three types of functional polymer fibers can be manufactured based on the standard manufacturing process. In the depicted embodiment, the three types of functional polymer fibers comprises of: (1) Monofilament fine fiber staple fibers; (2) Low melting binder fibers also referred to as "binder resins"; and (3) Bicomponent binder fibers with a core-shell type structure (further illustrated in FIG. 4), where the inner core structure of the polymer fiber has a higher molecular weight and a higher melting temperature polymer, and a second, lower molecular weight polymer is added to form the shell though the addition of a separate second polymer melt flow into which the functional additive is added.

In another aspect of the present disclosure, the manufactured fibers can be crimped and cut to an appropriate length to create a material that can be processed into a nonwoven fiber material. The cut length of the fibers will differ for different processes with shorter fibers (<12 mm length) for wet-laid processes and longer fibers (>20 mm) for dry-laid or air-laid processes.

It is to be noted that the antimicrobial fibers and binder fibers thus manufactured can then be blended with both functional and standard fibers and can be processed using standard cost-effective manufacturing processes such as, but not limited to, dry-laid, air-laid or wet-laid processes to form filter media of a defined basis weight and permeability depending upon the specific application and desired efficiency and bonded using one of a range of options such as, but not limited to, needlepunching, hydroentanglement, thermal bonding on a high temperature calendar, thermal bonding using a through air dryer or bonding through the application of liquid chemical binder resins for use in applications from face masks and respirators to air filters for HVAC and higher efficiency HEPA applications.

In an aspect of the present disclosure, a method of manufacturing antimicrobial fibers using a novel antimicrobial zeolite additive material is provided. In the depicted embodiment, the method comprises using various antimicrobial metals incorporated and embedded into an inorganic material as metal ions within the crystal structure of the zeolite that can be formulated into a masterbatch precursor material and processed to manufacture fine or synthetic fibers using standard manufacturing processes (e.g., melt spinning manufacturing processes for monofilaments, low melting binder fibers and biocomponents).

In another aspect of the present disclosure, a method of manufacturing antimicrobial fibers using a novel antimicrobial zeolite additive material is provided. In the depicted embodiment, the method uses a blend of standard and low antimicrobial, low melt binder fibers (either as monofilaments or bicomponent binder fibers) to manufacture a filter media. By way of example and not of limitation, in the depicted embodiment, the blend is configured to create a structural material with a certain predetermined inherent strength required to function as a filter media.

In another aspect of the present disclosure, a method of manufacturing antimicrobial fibers using a novel antimicrobial zeolite additive material is provided. In the depicted embodiment, the method comprises using various antimicrobial metals incorporated into an inorganic material that can be formulated into masterbatch precursor materials and processed to manufacture fine denier fibers using standard manufacturing processes wherein the antimicrobial fine denier fibers allows the filter media to achieve a higher efficiency with a low pressure drop within the air filtration system. It is to be noted that a certain optimized level of additive required to achieve a certain level of functional activity can be obtained via the use of a blend of antimicrobial fibers and standard fibers.

This summary is provided to introduce a selection of concepts in a simplified form that are further described in the detailed description of the disclosure. This summary is not intended to identify key or essential inventive concepts of the claimed subject matter, nor is it intended for determining the scope of the claimed subject matter. It is to be noted that the references made above in detail to the embodiments of the disclosure are provided by way of explanation of the disclosure, not in limitation of the disclosure. It will be apparent to those skilled in the art that various modifications and variations can be made in the present disclosure without departing from the scope or spirit of the disclosure.

Features illustrated or described as part of one embodiment can be used on another embodiment to yield a still further embodiment. Thus, it is intended that the present disclosure cover such modifications and variations as come within the scope of the appended claims and their equivalents. Other objects, features and aspects of the present disclosure are disclosed in the following detailed description. It is to be understood by one of ordinary skill in the art that the present discussion is a description of exemplary embodiments only and is not intended as limiting the broader aspects of the present disclosure, which broader aspects are embodied in the exemplary constructions.

BRIEF DESCRIPTION OF THE DRAWINGS

The disclosure will be more readily understood in view of the following description when accompanied by the below figures.

The accompanying figures incorporated in and forming a part of the specification illustrate several aspects of the present invention and, together with the description, serve to explain the principles of the invention.

FIGS. 1-3 illustrate the flowchart depicting a method of manufacturing and producing antimicrobial fibers using a novel antimicrobial zeolite additive material.

FIG. 8 shows various bicomponent structural shapes and morphologies where the components are co-extruded to form fibers with different cross-sections and formations.

DETAILED DESCRIPTION OF THE DISCLOSURE

Figure 2:
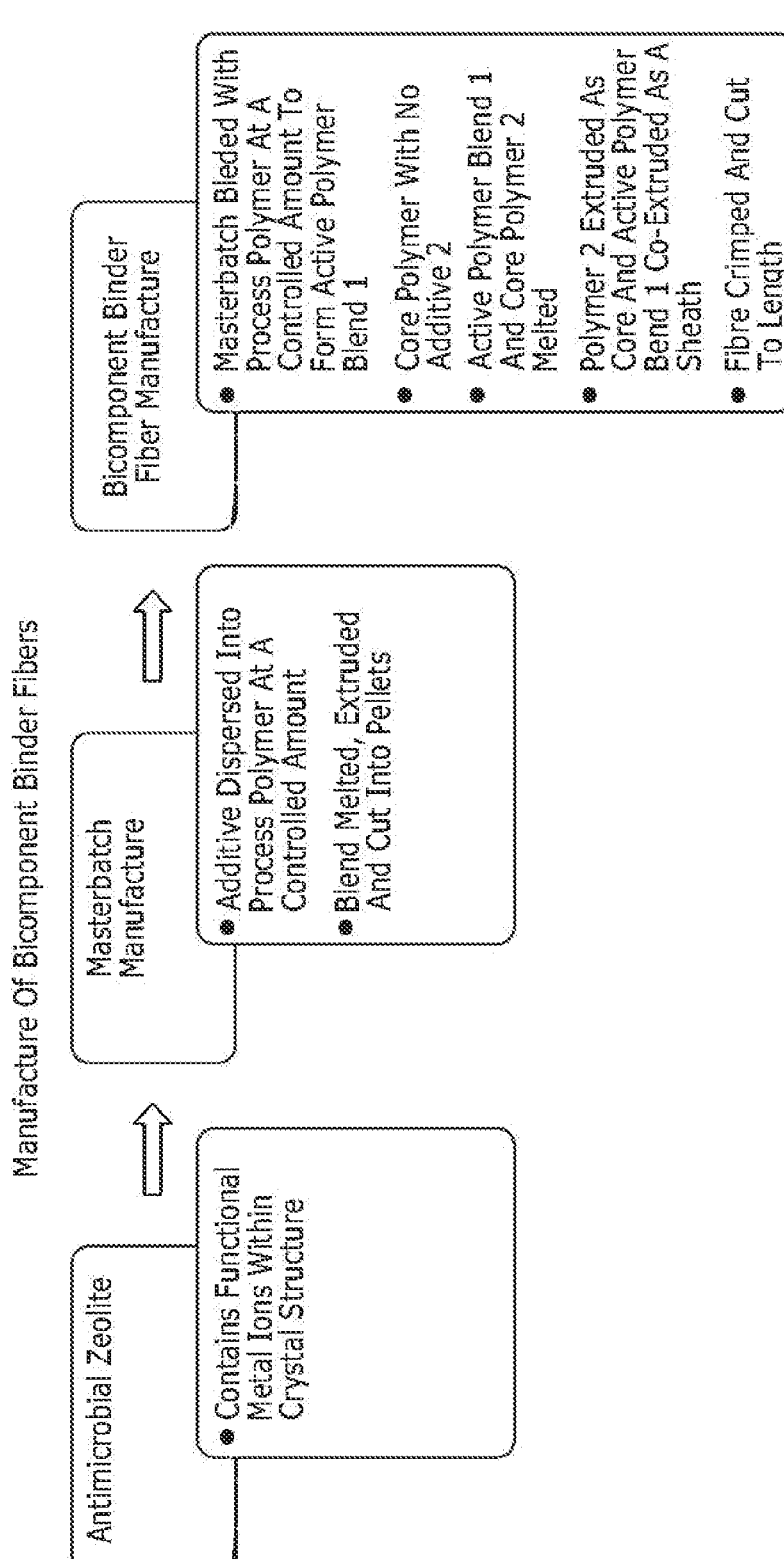

For the purposes of promoting and understanding the principles disclosed herein, reference is now made to the preferred embodiments illustrated in the drawings, and specific language is used to describe the same.

It is understood that no limitation of the scope of the disclosure is hereby intended. Such alterations and further modifications in the illustrated apparatus and such further applications of the principles disclosed and illustrated herein are contemplated as would normally occur to one of ordinary skill in the art to which this disclosure relates.

The present disclosure is directed to a method of manufacturing and producing antimicrobial fibers using a novel antimicrobial zeolite additive material. In the depicted embodiment, the method comprises the steps of:

In an aspect of the present disclosure, a method for manufacturing the antimicrobial fibers is provided. In the depicted embodiment, the method comprises (1) selecting an active inorganic-based ingredient; (2) forming a masterbatch encapsulation in a process polymer; (3) blending the masterbatch into the process polymer to form the active polymer that is then formed into either antimicrobial monofilament or bicomponent binder fibers. It is to be noted that the process for the formation of the bicomponent binder fibers differs from that of the monofilament binder fibers in that the additive masterbatch is added exclusively to the external sheath (these two distinct processes are shown in FIGS. 1 and 2 below).

In an embodiment, a first masterbatch encapsulation is formed by dispersing the active inorganic-based ingredient into a first process polymer. The first masterbatch encapsulation is then blended with a second process polymer to form a second masterbatch. Thereafter, the second masterbatch is formed into an active polymer such as an antimicrobial monofilament or bicomponent binder fiber.

In the embodiment described above, the first and second process polymers are comprised of the same materials. In an alternative embodiment, the first and second process polymers are comprised of different materials.

In an aspect of the present disclosure, a method for manufacturing the filter media is provided. In the depicted embodiment, the method comprises (1) creating a formulation by mixing antimicrobial monofilament fibers with non-functional monofilament fibers and adding antimicrobial binder fibers either monofilament low malt fibers and/or bicomponent fibers to form a blend wherein the level of binder fibers is dictated by the desired strength and stiffness to be achieved in the final filter media; (2) blending of the fibers into a homogenous mix using mechanical mixing of dry fibers via carding or wet mixing of fibers dispersed in a tank of water aided with a high shear mixer or hydro-cyclone mixer; (3) forming of the web wherein the fiber mixture is laid upon a continuous carrier fabric or supporting filter media laid upon a carrier fabric in a continuous process with the basis weight controlled through the speed of the carrier fabric in relation to the rate of feed of the fiber onto the carrier fabric; (4) binding and drying wherein the web formed can be bound together using a range of different techniques either on their own or in combination.

It is to be noted that mechanical entanglement of the fibers through needlepunching or hydroentanglement causes the fibers to intertwine forming a cohesive material. This also densifies the material, decreasing thickness and permeability and increasing filtration efficiency. Chemical binding using an aqueous or solvent based adhesive binder solution or dispersion can also be applied to increase strength and/or add surface properties such as hydrophobic or oleophobic coatings. The application of the binder can be via standard coating methodologies such as padding, gap set coaters and/or a spray application. The binders could contain an antimicrobial additive to add further functionality to the antimicrobial fibers. Finally, the binder fibers are fused to the monofilament fibers to create a dense, stiff filter media that is suitable for pleating.

In another aspect of the present disclosure, a range of thermal techniques can be used for this including drying cylinders heated with steam or thermal oil, a heated, thermal calendar pressing and fusing the media, a thermal oven using hot air or a specific Through Air Dryer (TAD), where the web is wrapped around a large, heated drum and hot air is passed through the media to dry and fuse it.

By way of example and not of limitation, each of the various methods can be used to control the final properties of the filter media being manufactured to obtain the performance required for the final application can alter the formulation balance between monofilament and binder fiber necessary to achieve a desired level of strength and stiffness for the final application. For example, where the media is to be used as a self-supported media for a pleated element, the stiffness and mechanical strength will have to be high, necessitating a high level of binder fiber (often >60%). In cases where a media is to be either supported with a backing material such as a wire mesh in a pleated pack or wrapped or laid as a non-pleated pad, the inherent strength and stiffness of the media can be lower, reducing the level of binder fiber that is necessary (often <40%). The process used alters these levels of material significantly. The process used in manufacturing the media is summarized in FIG. 3.

It is to be noted that by way of example and not of limitation, the antimicrobial fibers can be processed using a range of standard manufacturing processes to form filter media with different levels of efficiency for use in applications from face masks and respirators to air filters for air-conditioning (HVAC) and higher efficiency HEPA applications.

In one aspect of the present disclosure, a method of manufacturing and producing antimicrobial fibers using a novel antimicrobial zeolite additive material comprises selecting antimicrobial metals from a group including Zinc, Copper, Silver, Gold, Ruthenium, Osmium, Iridium and Platinum is provided.

In the depicted embodiment, the method comprises incorporating the foregoing antimicrobial metals into an inorganic material that can be further formulated into masterbatch precursor materials and processed into the manufacture of fibers. It is to be noted that the above method can be used to produce fine denier fibers (between 0.3 denier and 2 denier), cut fibers (of between 35 mm and 70 mm (1.38 inches to 2.76 inches) in length), monofilament fibers and binder fibers. Binder fibers can be both low melting point monofilament fibers or bicomponent fibers. Monofilament binder fibers have a significantly lower melting point than that of the main monofilament fiber that can soften and adhere to the monofilament fibers creating a structural bond within the media. Binder fibers can also be bicomponent fibers, with a low melting point on the sheath and a higher melting point core where the lower melting point sheath acts to bind the fibers together. Traditionally a "bicomponent binder fiber" is defined as having a coaxial cross-section comprising two distinct layers of polymers with different properties, usually defined by melting temperature. However, bicomponent fibers can also be related to solubility in solvents where the function of the bicomponent is to create a dispersed number of smaller diameter fibers from a single fiber, often known as "splitable" fibers.

Figure 8:
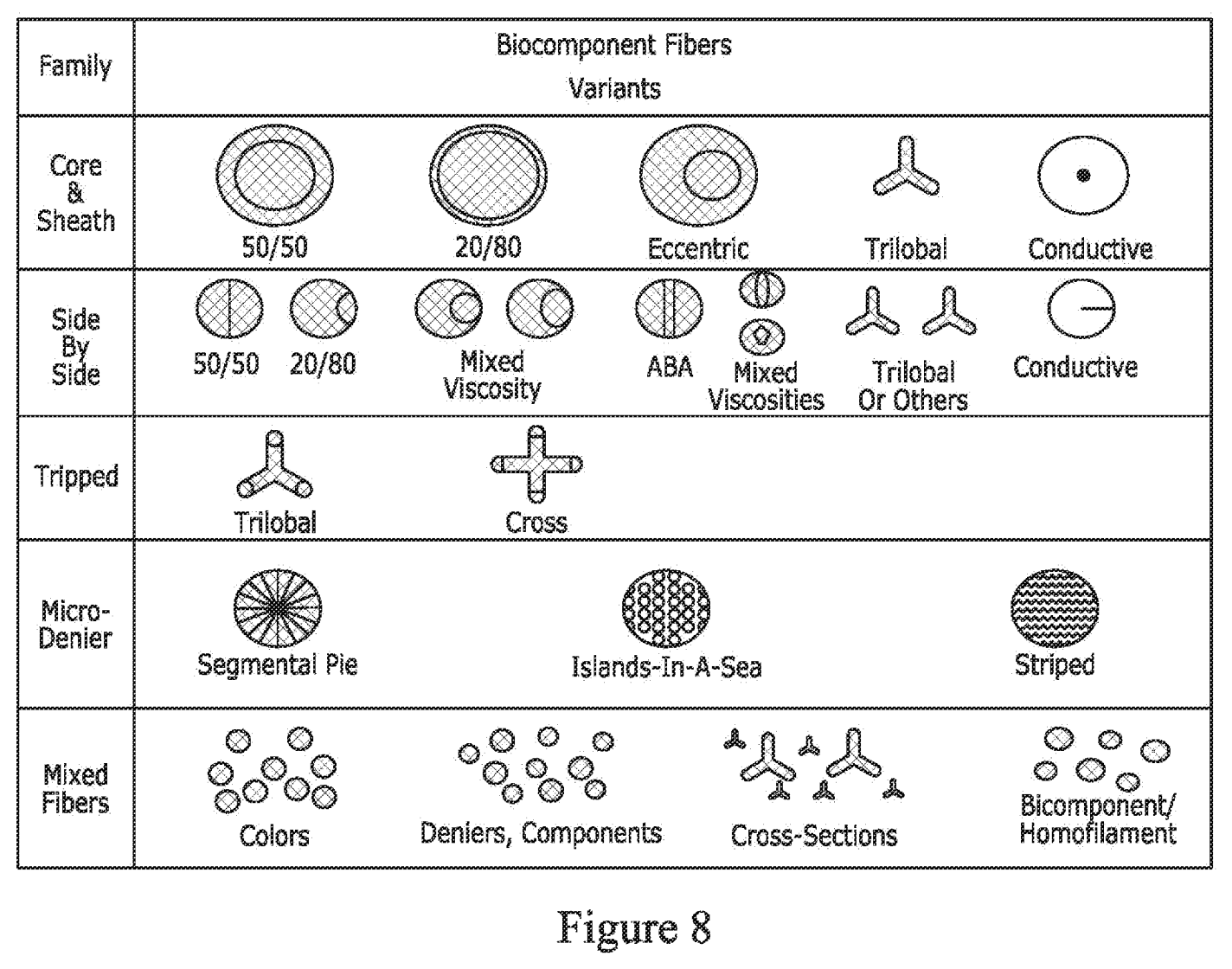

It is to be noted that the structural definition of a bicomponent fiber is not just limited to a coaxial structure but can include different structural shapes and morphologies where the two components are co-extruded to form fibers with different cross-sections including core and sheath, side by side, tipped, segmented and "islands in the sea," as shown in FIG. 8:

By way of example and not of limitation, the blending of both antimicrobial and monofilament fibers in conjunction with standard fibers creates a material which can be further processed into specific products for air filtration with specific levels of filtration efficiency.

In another aspect of the present disclosure, a method of manufacturing and producing antimicrobial fibers using a novel antimicrobial zeolite additive material comprises the steps of dispersing an active ingredient through the thickness of the fiber. The dispersion of the additive through the fiber is achieved through the blending of the masterbatch additive as a granulated powder within the polymer granulate prior to melting the polymer. This can be achieved through a continuous addition of the masterbatch additive through screw pumps pushing a second flow into the main polymer flow entering the melter or through batch addition into the main polymer hopper and mixing the two components prior to feeding into the melter.

In another aspect of the present disclosure, monofilament fibers have even dispersion of the additive through the entire diameter of the fiber with a proportion of the additive at the surface and are able to interact with the biological species on the surface, releasing the metal ions into the environment and making the fiber efficacious. This is shown in the image below where the functional additive is on the surface of the fibers. If the additive is fully encapsulated within the matrix of the fiber then it is less able to release ions into the environment, reducing the efficacy of the additive. Reducing the fiber diameter increases the surface area to volume ration, increasing the proportion of additive at the surface, reducing the actual level of additive required to be efficacious. In binder fibers, the additional process of melting the fibers in the binding step allows for a level of migration of the additive towards the surface resulting in a more effective dispersion and increased activity. Bicomponent fibers described within this patent are manufactured with the masterbatch additive dispersed solely within the sheath, increasing the level of efficacy of the additive through the increased level of additive at the surface. In the depicted embodiment, the additive is only active at the surface of the fiber thereby maximizing the distribution and the level of dosing of the additive within the fiber.

In another aspect of the present disclosure, a method of manufacturing and producing antimicrobial fibers using a novel antimicrobial zeolite additive material is provided. In the depicted embodiment, a bicomponent process is designed to optimize the surface functionality of the active ingredient through the loading of the functional additive into the polyester mix of an outer sheath of a fiber with a higher melting point polyester core. In the depicted embodiment, the finished product is created with active additive materials on the surface of the fiber to ensure high levels of functionality at the surface, reducing the level of active ingredient required for full efficacy.

It is to be noted that the mechanism of efficacy of the invention comes from the presence of functional metal ions within the crystal structure of the additive. These ions are labile and can be replaced by other metal ions in the presence of moisture. Biological materials such as cells have a level of sodium in order for them to maintain an osmotic potential and function. These ions can exchange with the metal ions in the additive and can be transported to the cells acting in a number of different ways to effectively kill the cells. The combination of certain metals act in a synergistic way to attack proteins in the cell walls, allowing other functional ions to easily enter the cells and neutralize them by the mechanisms of sterilization through prevention of replication of the DNA, suffocation through the interaction with key enzymes associated with the respiratory function of the cell and starvation through the interaction with key enzymes associated with nutrient transport across the cell walls.

In another aspect of the present disclosure, a method of manufacturing and producing antimicrobial fibers using a novel antimicrobial zeolite additive material is provided. In the depicted embodiment, the fibers are blended into a nonwoven fiber mixture (furnish) in combination with the functional fibers, functional binder fibers and standard (non-functional) fibers to create standard synthetic filter media materials using standard manufacturing processes such as air laid, carded, spunlace, needlepunched, meltblown or wet laid. In the depicted embodiment, the binder fiber is thermally melted under heat and pressure in a thermal calendar to create a nonwoven article (FIG. 5) with the melted components of the binder fiber providing material strength and stiffness through binding of the monofilament fibers at the cross points of the material and further distributing the additive through the nonwoven structure and providing additional antimicrobial functionality.

It is to be noted that the filter media, antimicrobial fibers, manufactured using a novel antimicrobial zeolite additive material can be further processed and manufactured into various designs and applications relating to other products. By way of example and not of limitation, such filter media can be used for bag filters, pleatable filter cartridges, wrapped filter and pre-filter and other similar products.

Figure 3:
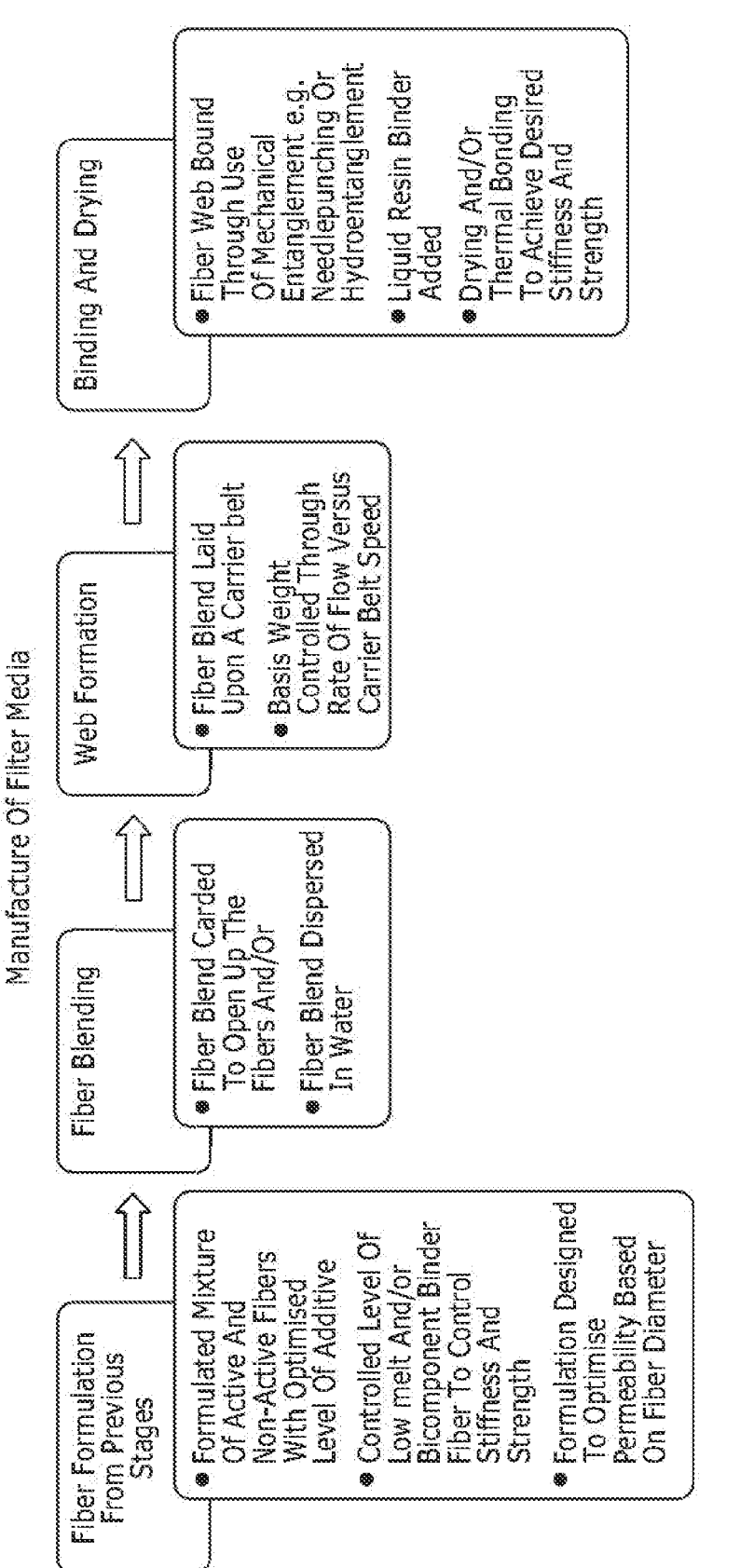
Figure 4:
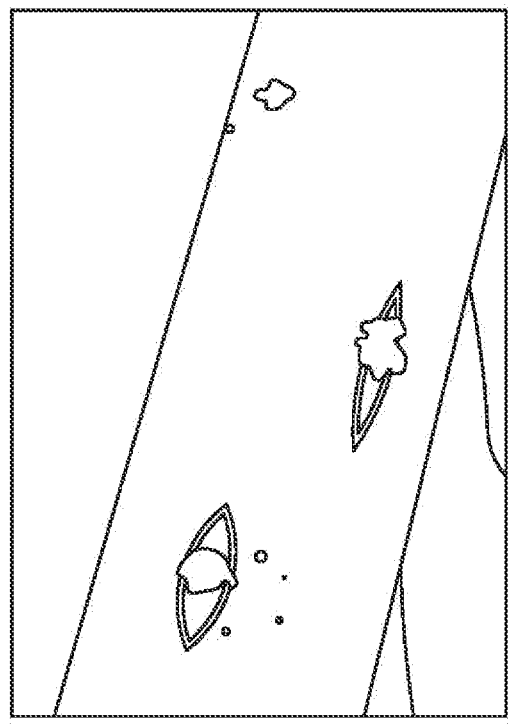
FIGS. 4 and 5 show an antimicrobial fiber produced using a novel antimicrobial zeolite additive material wherein the additive is dispersed through the thickness of the fiber.
Figure 5:
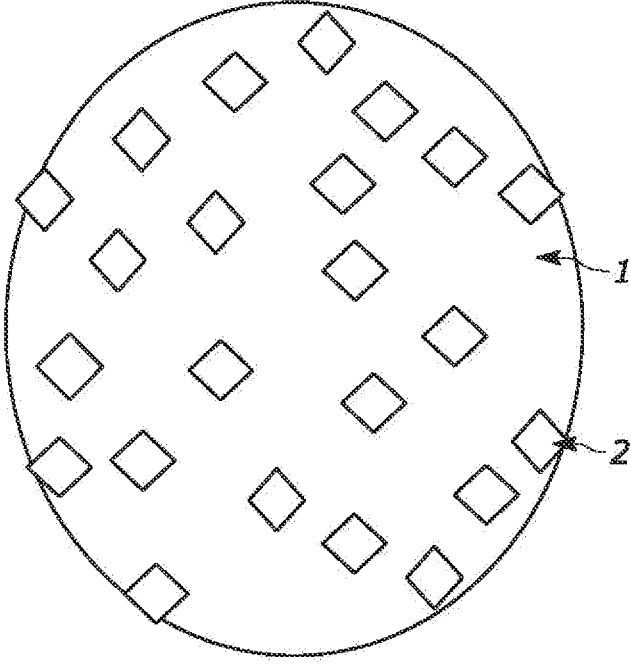
Figure 6:
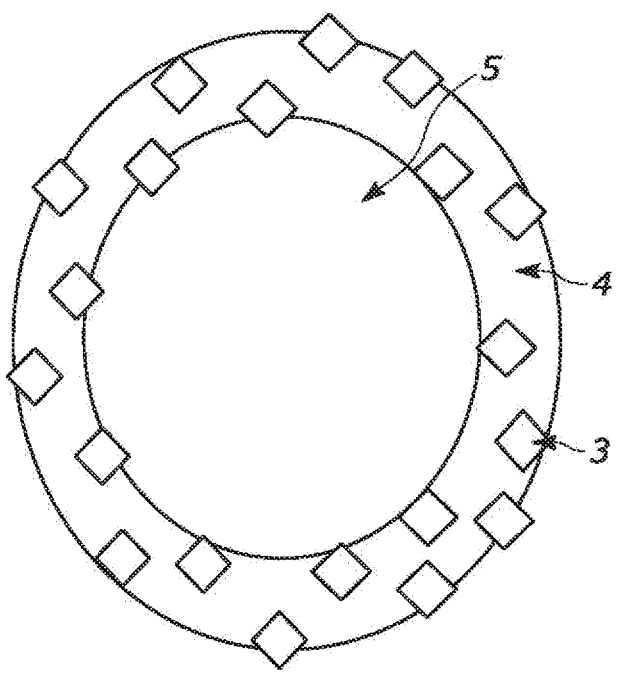
FIG. 6 shows an antimicrobial fiber produced using a novel antimicrobial zeolite additive material wherein the additive is dispersed through the thickness of the fiber through the loading of the functional additive into the polyester mix of an outer sheath of a fiber.
Figure 7:
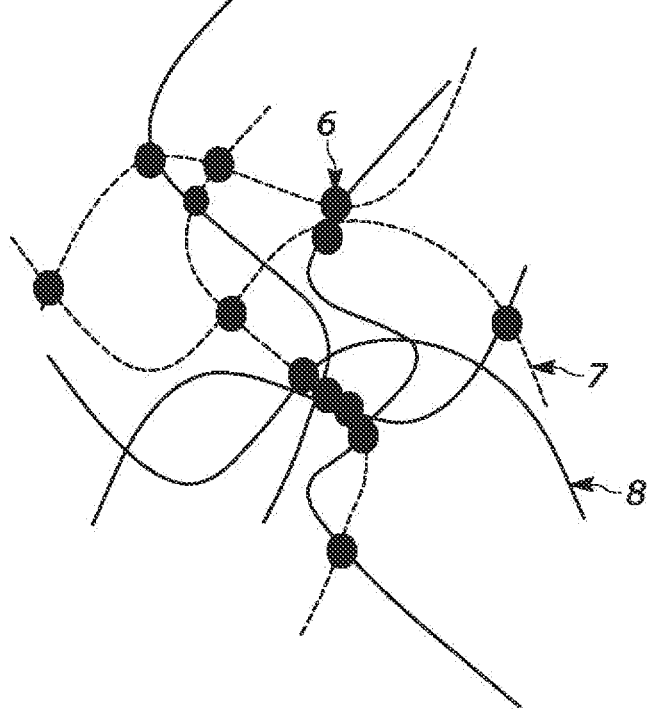
FIG. 7 shows an antimicrobial fiber produced using a novel antimicrobial zeolite additive material wherein the fibers are blended into a nonwoven fiber mixture (furnish) in combination with fibers.

FIGS. 1-3 illustrates flowchart depicting a method of manufacturing and producing antimicrobial fibers using a novel antimicrobial zeolite additive material. FIGS. 4 and 5 show an antimicrobial fiber produced using a novel antimicrobial zeolite additive material wherein the additive is dispersed through the thickness of the fiber. FIG. 6 shows an antimicrobial fiber produced using a novel antimicrobial zeolite additive material wherein the additive is dispersed through the thickness of the fiber through the loading of the functional additive into the polyester mix of an outer sheath of a fiber. FIG. 7 shows an antimicrobial fiber produced using a novel antimicrobial zeolite additive material wherein the fibers are blended into a nonwoven fiber mixture (furnish) in combination with fibers.

FIG. 6 shows an antimicrobial fiber produced using a novel antimicrobial zeolite additive material wherein the additive is dispersed through the thickness of the fiber by loading the functional additive into the polyester mix of an outer sheath of a fiber with a higher melting point polyester core to create the antimicrobial material. As illustrated, the active material at the surface of the fiber ensures high levels of functionality at the surface while reducing the level of active ingredient required for full efficacy. As further depicted in FIG. 6, the addition of the functional component (3) into the outer, sheath layer (2) of the bicomponent binder fiber creates an outer functional layer. It is to be noted that the core of the fiber (1) does not contain any functional additive material eliminating costly components in the core of the fiber where they do contribute functionally to the activity of the material.

FIG. 7 shows an antimicrobial fiber produced using a novel antimicrobial zeolite additive material wherein the fibers are blended into a nonwoven fiber mixture (furnish) in combination with the functional fibers, functional binder fibers and standard (non-functional) fibers to create standard synthetic filter media materials using standard manufacturing processes such as air laid, carded, spunlace, needlepunched, meltblown or wet laid. As illustrated in FIG. 7, the binder fiber is thermally melted under heat and pressure in a thermal calendar to create a nonwoven article with the melted components of the binder fiber (7) providing material strength and stiffness through binding of the monofilament fibers (8) at the cross points (6) and further distributing the additive through the nonwoven structure, providing additional antimicrobial functionality.

FIG. 8 shows that the structural definition of a bicomponent fiber is not just limited to a coaxial structure but can include different structural shapes and morphologies where the two components are co-extruded to form fibers with different cross-sections including core and sheath, side by side, tipped, segmented and "islands in the sea."

In another aspect of the present disclosure, the filter efficiency to be achieved is determined by the fiber diameter (also known as denier) of the fibers used. By way of example and not of limitation, a standard filter media is achieved through a blend of coarse (large denier) fibers and fine (low denier) fibers. This is critical to ensuring the fiber density required to create a porous structure with enough inherent strength for subsequent processing and end use application.

It is to be noted that various permissible ranges of the additive elements and fibers can be used to manufacture the antimicrobial fibers using the novel antimicrobial zeolite additive material. By way of example and not of limitation, the permissible ranges comprises: (1) active fiber content in the filter media in the range of 20% to 100% both as binder fiber and as single monofilament fiber; (2) binder fiber (either low melt monofilament or bicomponent) present in the filter media in the range of 20% to 100%; (3) active metal ion content in the final media range from 0.01% w/w to 0.5% w/w as measured by Atomic Absorption Spectroscopy (AAS) of the inorganic based ingredient of the filter material; (4) a masterbatch additive level wherein the active inorganic based ingredient is between 1% and 5% w/w within the active fiber (i.e., the monofilament and binder fibers respectively); (5) additive level within the masterbatch of between 10% and 30% w/w, such that the active inorganic-based ingredient within the process polymer is between 10% and 30% w/w; (6) filter media basis weight range from 40 gsm to 250 gsm; (7) filter media thickness from 0.4 mm to 20 mm thick; (8) filter permeability range from 500 l/m²s to 6,000 l/m²s at 200 Pa (60 cfm to 750 cfm at 0.5" water gauge); and (9) filter efficiency range from ASHRAE 52.2 MERV 8 to MERV 15 creating an equivalent filtration efficiency range from EN779:2012 G4 to F9.

In another aspect of the present disclosure, various embodiments of a method of manufacturing and producing antimicrobial fibers using a novel antimicrobial zeolite additive material is provided. In the depicted embodiment, a Sciessent (Sciessent llc, Beverly, MA, USA) Agion ACH 80H with zeolite based antimicrobial agent with Copper and Silver ions within the inorganic structure is dispersed into 9921M polyethylene terephthalate and manufactured into a pelletised masterbatch material with an active content of 20% of the AC80H. It is to be noted that the material has the following typical characteristics: (a) specific gravity: 1.1-1.3 and (b) Meltflow (260° C./2.16 kg) 10-20.

In the depicted embodiment, the masterbatch material is then blended at 5% active level to form two specific shortcut fibers for use in air-laid filter manufacturing. The length and fineness of the fibers would be understood by anyone familiar with the art of nonwovens manufacture.

In the depicted embodiment, the manufacture of the fineness is defined by the mass of a length of fiber per unit length and is measured in denier-defined as the weight in g of 9000 m. By way of example and not of limitation, an alternative measurement is dTex which is defined as the weight in g of 10.000 m thereby creating an offset of a factor of 1.1 between the two measurements. It is to be noted that a denier of 4.0 with polyester has a diameter of 20.2 μm while a similar 1.7 denier fiber will have a diameter of only 13.2 μm. The finer the fibers used the higher the efficiency for any given basis weight of a filter, so a finer fiber of 1.7 denier will give a higher level of filtration efficiency than a 4.0 denier fiber for the same airflow.

Various examples of embodiments are noted below.

Example 1

A monofilament binder fiber of 4.0 denier (4.4 dTex) is manufactured with a low melt as shown in FIG. 2. The masterbatch is dispersed within the fiber at a level of 5% of the total weight of the fiber and is crimped and cut in the extrusion process to a length of 64 mm. The properties are shown below in Table 1:

TABLE 1

| 4.0 Denier × 64 mm low melt fiber with 5% Sciessent Agion ® Masterbatch MB 1356 | | | | |
| --- | --- | --- | --- | --- |
| Property | Unit | Target | Range | Average |
| Denier per filament | Denier | 4.00 | ±0.5 | 4.00 |
| Fiber length | Inches | 2.50 | ±0.25 | 2.50 |
| Fiber length | mm | 64.00 | ±6 | 64.00 |
| Crimp per inch | | 8.00 | ±1 | 8.10 |
| Finish Oil Content | % | 0.25 | ±0.1 | 0.27 |
| % Elongation | % | 60.00 | ±20 | 52.31 |
| Tenacity | g/den | 2.00 | ±1.0 | 2.69 |
| Ash content (10' at 650° C.) | % | 0.95 | | 1.06 |

Example 2

A monofilament binder fiber of 4.0 denier (1.7 dTex) is manufactured as a staple as shown in FIG. 2. The masterbatch is dispersed within the fiber at a level of 5% of the total weight of the fiber and is crimped at 12 crimps per inch and cut in the extrusion process to a length of 38 mm. The properties are shown below in Table 2:

TABLE 2

| 1.5 Denier × 38 mm staple fiber with 8% Sciessent Agion ® Masterbatch MB1356 | | | | |
| --- | --- | --- | --- | --- |
| Property | Unit | Target | Range | Average |
| Denier per filament | Denier | 1.50 | | 1.50 |
| Fiber length | Inches | 1.50 | | 1.50 |
| Fiber length | mm | 38.00 | | 38.00 |
| Crimp per inch | | 12.00 | | 12.20 |
| Finish Oil Content | % | 0.20 | | 0.27 |
| % Elongation | % | 60.00 | | 59.09 |
| Tenacity | g/den | 3.00 | | 2.87 |
| Ash content (10' at 650° C.) | % | 1.52 | | 1.60 |

In another aspect of the present disclosure, a method of manufacturing a filter media using the antimicrobial fibers is provided. The filter media can be manufactured using various processes known by persons having ordinary skill in the art. By way of example and not of limitation, an air-laid (dry-laid) carding process can be used to manufacture the filter media.

In depicted embodiment, bales of around 50 kg are mixed into a fiber blender. The blend mix (or furnish) of the fibers along with the basis weight and final thickness (or density) of the fibers determines the permeability (also known as porosity) of the filter material. First, the process opens up the fibers and mixes them to create a blend of the different fibers. Second, the fibers are laid down and then worked on the carding loom to help separate the fibers further. Finally, the filter media is formed onto the final carrier wire where strength development is applied to the final filter media. By way of example and not of limitation, the filter media can be applied to another supporting layer or can even be self-supporting through the control of the level of binder fibers.

It is to be noted that the manufacturing process can be undertaken in multiple layers from multiple carding looms to create a gradient density structure with different levels of permeability from the bottom layer to the top layer.

In another aspect of the present disclosure the mixed fibers from the carding loom are formed onto a belt moving at a rate that can control the basis weight of the final filter that is desired and are then bound using one or more of four methods described below:

Needlepunching Method (NPM): In this method, needles are moved vertically through the depth of the material to pull fibers together to entangle them to help bind the fibers into a matrix and reduce the thickness of the filter material, increasing density and binding multiple layers together.

Hydroentanglement Method (HEM): In this method, the media is passed through a series of high-pressure water jets applied to both sides of the web to find the fibers and create density within the web.

Resin Bonding Method (RBM): In this method, a wet chemical resin binder can be applied to the filter fabric. Resins including, but not limited to, natural product, sugar-based binders resins, acrylic and vinylic aqueous based latexes, solvent or water-based epoxy or phenolic resins can be applied through a range of processes including padding, gap-set coaters and spray applicators.

Antimicrobial Resin Bonding Method (ARBM): In this method, a water or solvent based chemical resin binder of the chemical types described in RBM above with antimicrobial functionality applied using the processes in the RBM above. In the depicted embodiment, the resin binders are chemically modified with additives such as silver or other metal particles to create a surface that is functionally antimicrobial. By way of example and not of limitation, an alternative technology using a functional polymer based on Polyvinyl amine can both bind the fibers and creates a surface with a strong bonding characteristic towards bacteria and viruses, trapping them into the surface and reducing the ability for the biological functioning of the trapped materials.

Thermal Bonding Method (TBM): In this method, the material passes on the belt through a hot air oven where the temperature is adjusted to melt the binder fibers or dry and cure the applied resin binder to create an inherently strong media. A modification of this method uses a TAD where the web is wrapped around a drum with a perforated cylinder and heated with air passing from outside to inside.

Calendering Method (CM): In this method, the media is passed through a series of high temperature rolls pressed together that can either be plain or patterned to create a bonding between the fibers and wherein the media is further compressed to increase density of the finished product. It is to be noted that the temperature of the bonding has to be carefully adjusted to maintain dimensional stability and prevent shrinkage of the fibers and to also soften the binder fibers or resins to create attachments between the fibers (also shown in FIG. 5).

Example 3

A blend of active low melt binder fibers, active monofilament fibers described in Examples 1 and 2 respectively above, are blended with standard 2.4 denier (2.6 dtex) monofilament fibers in the finish shown in Table 3 below.

TABLE 3

|  | Example 3 carded nonwoven with needlepunching |
| --- | --- |
| 1.5 D 38 mm Monofilament 5% active ingredient | 10% |
| 4 D 64 mm low melt 8% active ingredient binder fiber | 45% |
| PES Monofilament 2.4 D 38 mm | 45% |
| Active total Ag & Cu content in monofilament fibers | 0.14% |
| Active total Ag & Cu content in monofilament fibers | 0.09% |
| Total calculated % Cu/Ag active content per 100 g media (as measured by combustion and AAS) | 0.0550% |

It is to be noted that the formulation is optimized to create an evenly distributed level of fibers with the active ingredients in the fiber blend. The level of silver and copper ions in the fiber furnish are calculated based on the total active level of the silver and copper content in the fibers measured by atomic absorption spectrophotometry of the inorganic residues following combustion.

In the depicted embodiment, based on the blend the media is formed into a needlepunched, carded material which is thermally bonded in an oven to soften the binder fibers. The typical properties of the media formed using this method are shown in Table 4 below:

TABLE 4

|  | Property | Unit | Measured Values |
| --- | --- | --- | --- |
| 1 | Basis Weight | g/m$^2$ | 101 |
| 2 | Thickness | mm | 1.3 |
|  |  | in | 0.052 |
| 4 | Filter Fractional | MERV | 8 |
|  | Efficiency | E1 (0.3-1.0 μm) | 5% |
|  | ASHRAE 52.2 | E2 (1.0-3.0 μm) | 30% |
|  |  | E3 (3.0-10 μm) | >85% |
| 5 | Air Permeability | L/m$^2$ · s @200 Pa | 3500 |
|  |  | CFM @ 0.5" WG | 430 |

In another aspect of the present disclosure, a method of manufacturing a filter media using the antimicrobial fibers is provided wherein a Microbiological Efficacy Testing (MET) is conducted on the filter media, as further noted below:

In the depicted embodiment, the antimicrobial efficacy of the media manufactured can be tested for antiviral efficacy by any external laboratory facility approved to conduct such testing (such as the Microbac Laboratories Inc. (105 Carpenter Drive, Sterling, VA 20164, USA)). The testing is performed by using a misting study based on AATCC 100:2004 customized for viruses and the SARS-Associated Coronavirus (SARS-CoV) CDC strain 200300592, ZeptoMetrix. During testing, the virus inoculum is misted onto a 2×2 inch area of precut test fabric and a liquid control using a Nalgene Aerosol Spray Cap Bottle is sprayed from a distance of between 3" and 6" applied for one second per sample. The media sample was placed in contact with the virus for five minutes before being extracted and allowed to develop in a mixture of Minimum Essential Medium (MEM), 1% fetal bovine serum (FBS), 1% NaHCO$_3$+1% HEPES+10 μg/ml Gentamicin+2.5 μg/mil Amphotericin B+1 mM EDTA. A non-active fabric was tested as the control.

The 50% tissue culture infectious dose per ml (TCID$_{50}$/ml) was determined using the Spearman-Karber method using the following formula:

$$m = x_k + \left(\frac{d}{2}\right) - d\sum p_i$$

Where:

m=the logarithm of the titer relative to the test volume x$_k$=the logarithm of the smallest dosage which induces infection in all cultures d=the logarithm of the dilution factor p$_i$=the proportion of the positive results in dilution i Σp$_i$=the sum of p (starting with the highest dilution producing 100% infection)

The values were converted to TCID50/ml using a simple inoculum of 1.0 ml.

The viral load was determined in the following manner:

Viral load(log$_{10}$TCID$_{50}$)=Titer(log$_{10}$TCID$_{50}$/ml)+
    log$_{10}$[volume (ml)].

The log$_{10}$ reduction factor (LRF) was calculated in the following manner:

Log$_{10}$ Reduction Factor=Initial Viral Load
    (log$_{10}$TCID$_{50}$)−Output Viral Load
    (log$_{10}$TCID$_{50}$).

The mean viral log$_{10}$ reduction was the average of n replicates. These were converted to a percentage reduction using the following calculation:

Log$_{10}$ reduction = $A$

% reduction = $B$ $$B = \left[1 - \frac{1}{10^4}\right] \times 100$$

The results in summary are shown in Table 5 (below).

TABLE 1

| Replicate Number | Initial Viral Load (log10 TCID50) | Output Viral Load (log10 TCID50) | Log 10 Reduction | Reduction (%) |
|---|---|---|---|---|
| 1 | 6.80 | 4.35 | 2.45 | 99.64 |
| 2 | | 4.35 | 2.45 | 99.64 |
| 3 | | 4.6 | 2.20 | 99.37 |
| | Mean Reduction | | 2.38 | 99.58 |

It is to be further noted that the level of functional fibers incorporated into the final blend is determined by the overall activity required to ensure the desired antimicrobial functionality. The active fibers can be blended into a mixture with a standard nonactive blend of fibers to ensure both optimal filtration performance and antimicrobial functionality. In addition, the antimicrobial resultant filter media can be combined through the use of mechanical or chemical bonding processes with other layers of different permeability, to create a gradient density structure with different levels of filtration efficiency, mechanical processability (e.g., stiffness for pleatability) or antimicrobial activity to create non-functional layers as required to protect downstream layers.

In another aspect of the present disclosure, the resultant filter media produced using a novel antimicrobial zeolite additive material can retain the filtration characteristics of their standard counterpart materials in terms of efficiency and are designed primarily for sub-HEPA HVAC efficiency ranges from G4 to F9 (to EN779:2012 which is equivalent to MERV 8 to MERV 15 to ASHRAE 52.2) and have an ability to neutralize any hazardous pathogens that are captured on the surface to a high level of efficacy as measured through standard antiviral activity testing to international standards such as AATCC100-2004, ISO18184-2014E or ISO20743:2007(E).

It is understood that the preceding is merely a detailed description of some examples and embodiments of the present disclosure, and that numerous changes to the disclosed embodiments may be made in accordance with the disclosure made herein without departing from the spirit or scope of the disclosure.

The preceding description, therefore, is not meant to limit the scope of the disclosure but to provide sufficient disclosure to allow one of ordinary skill in the art to practice the disclosure without undue burden. It is further understood that the scope of the present disclosure fully encompasses other embodiments that may become obvious to those skilled in the art, and that the scope of the present disclosure is accordingly limited by nothing other than the appended claims.

The invention claimed is:

1. An air filtration filter media comprising: a nonwoven mixture of a plurality of at least three different fibers, including (1) functional antimicrobial fibers, (2) functional antimicrobial binder fibers and (3) non-functional fibers, wherein the functional antimicrobial fibers and the functional antimicrobial binder fibers each include an active inorganic-based ingredient comprising a zeolite additive which is dispersed within an outer layer of each of the functional antimicrobial fibers and the functional antimicrobial binder fibers for an antimicrobial effect, wherein the zeolite additive is between 1% to 5% w/w of each of the functional antimicrobial fibers and the functional antimicrobial binder fibers and the zeolite additive includes a mixture of copper and silver ions having an active metal ion content between 0.01% and 0.5% w/w of the zeolite additive.

2. The air filtration filter media of claim 1, wherein the combination of the functional antimicrobial fibers and the functional antimicrobial binder fibers comprise 20%-100% of the content of the non-woven mixture.

3. The air filtration filter media of claim 1, wherein the functional antimicrobial binder fiber content comprises 20%-100% of the content of the non-woven mixture.

4. The air filtration filter media of claim 1, wherein the non-woven mixture has a weight between 40 gsm to 250 gsm.

5. The air filtration filter media of claim 1, wherein the non-woven mixture has a thickness between 0.4 mm to 20 mm.

6. The air filtration filter media of claim 1, wherein the non-woven mixture has a permeability between 500 l/m$^2$s to 6,000 l/m$^2$s at 200 Pa.

7. The air filtration filter media of claim 1, wherein the active inorganic-based ingredient within the non-woven mixture is between 10% to 30% w/w.

8. The air filtration filter media of claim 1, wherein the non-woven mixture has an efficiency range from ASHRAE 52.2 MERV 8 to MERV 15 and an equivalent filtration efficiency range from EN779:2012 G4 to F9.

9. The air filtration filter media of claim 1, wherein the functional antimicrobial fibers and functional antimicrobial binder fibers are configured as monofilament fibers or bicomponent fibers.

10. The air filtration filter media of claim 9, the bicomponent fiber comprising a non-functional core and a functional sheath, wherein the active inorganic-based ingredient is loaded into the polyester mix of the sheath.

11. The air filtration filter media of claim 1, wherein the air filtration filter media comprises:

a basis weight of 101 g/m$^2$; and a thickness of 1.3 mm (0.052 in);

an efficiency of ASHRAE 52.2 MERV 8; and an air permeability of 3500 L/m$^2$s at 200 Pa or 430 cubic feet per minute (cfm) at 0.5 in water gauge (WG).

12. The air filtration filter media of claim 1, wherein the antimicrobial effect comprises a reduction of greater than 99% of viral load when tested by the Spearman-Karber method at 50% TCID$_{50}$/ml.

* * * * *